United States Patent [19]

Itoh et al.

[11] Patent Number: 4,769,850
[45] Date of Patent: Sep. 6, 1988

[54] PATTERN RECOGNITION SYSTEM

[75] Inventors: Shoji Itoh, Tokyo; Hideo Suzuki, Yokohama, both of Japan

[73] Assignee: International Business Machines Corporation, Armonk, N.Y.

[21] Appl. No.: 917,583

[22] Filed: Oct. 10, 1986

[30] Foreign Application Priority Data

Nov. 26, 1985 [JP] Japan .................................. 60-263957

[51] Int. Cl.[4] .............................................. G06K 9/46
[52] U.S. Cl. ........................................ 382/25; 382/16; 382/6
[58] Field of Search ...................... 382/25, 28, 16, 22, 382/41, 19; 364/725, 721; 382/6

[56] References Cited

U.S. PATENT DOCUMENTS 4,618,989 10/1986 Tsukune et al. ....................... 382/25

Primary Examiner—James J. Groody
Assistant Examiner—Michael D. Parker
Attorney, Agent, or Firm—Marc A. Block

[57] ABSTRACT

The present invention relates to apparatus for separately extracting circular and linear components in a complex image, the apparatus comprising: (a) a circular filter means for covering a portion of the complex image by filter blocks, wherein the filter blocks comprise a center block and at least one set of blocks angularly disposed to encircle the center block; (b) a first calculator element for computing average image concentration value for each of a plurality of directions with said circular filter means covering a subject portion of the complex image, wherein the concentration value for one directional component is a maximum; (c) a second calculator element for computing a first feature S in which the values of the directional components are evaluated with maximum directional component being enhanced; (d) a third calculator element for computing a second feature value S' in which the values of the directional components are evaluated with the maximum directional component being weakened; and (e) a mode selector for selectively applying (i) the first feature value S to detect linear image components and (ii) the second feature value S' to detect circular image components.

14 Claims, 4 Drawing Sheets

FILTER FOR
LUNG CANCER CANDIDATES

CHEST RADIOGRAPH PROCESSING SYSTEM

FILTER FOR
LUNG CANCER CANDIDATES

FILTER FOR
BLOOD VESSELS

FEATURE VALUE CALCULATOR 14

EXTRACTION OF TEMPORARY BOUNDARY POSITIONS

LUNG CANCER CANDIDATE AREA

PATTERN RECOGNITION SYSTEM

FIELD OF THE INVENTION

The present invention generally relates to a pattern recognition system, and in particular to a pattern recognition system for extracting circular or linear components separately from a complex image including said circular and linear components mixed together.

DESCRIPTION OF PRIOR ART

A typical image including circular and linear components is a chest radiograph. Heretofore, there have been proposed several methods for detecting circular components regarded as abnormal shadows and linear components regarded as shadows of blood vessels from a chest radiograph. For detecting circular components, one prior approach involves a weighted linear filter responsive to space frequencies and a second prior approach involves a circle detector responsive to circular shapes. The weighted linear filter is designed to be able to cope with changes in the concentration of image in the horizontal direction of an image to avoid the effect of the breastbones. In other words, the filter is characterized by responding to the space frequencies in the horizontal direction. The circle detector extracts an image of feature values by Hough transformation and thereafter extracts candidates of a predefined condition by employing a predetermined threshold. At that time, smoothing is performed.

For detecting linear components, pulmonary angiography is a well known method. A differential filter has also been employed for extracting shadows of blood vessels from an ordinary radiograph by digital processing.

The above-mentioned linear filter has a problem in establishing a threshold because the number of candidates varies greatly with subtle changes in the threshold. Further, the shadows of lung cancers, which correspond better to image concentration distribution rather than space frequencies, are not well-adapted to such a linear filter responsive to space frequencies.

The above-mentioned circle detector does respond to shadows having circular shapes with relatively clear boundaries and detects vertical components in the shadows of tuberculous tumors, benign tumors, blood vessels, and so on. However, the circle detector is restricted in detecting the shadows of lung cancers which have obscure peripheries. Further, it also has the problem that the number of candidates largely changes according to thresholding.

The above-mentioned differential filter can extract the shadows of thick blood vessels near the hilum of the lung to some extent, but cannot detect at high accuracy those of thin blood vessels at the peripheral lung field.

SUMMARY OF THE INVENTION

Accordingly, it is the object of the present invention to provide a pattern recognition system for extracting circular or linear components selectively with high accuracy from a complex image including said circular and linear components, such as a chest radiograph.

The pattern recognition system according to the present invention is provided with means for calculating certain image-related feature values and means for detecting circular or linear components. The feature value calculating means calculates feature values by scanning an image with a directional multiple circular window filter and enhancing one or more selected directional components of features extracted with said filter. The component detecting means detects said circular or linear components based on said feature values.

DESCRIPTION OF A PREFERRED EMBODIMENT

Figure 1:
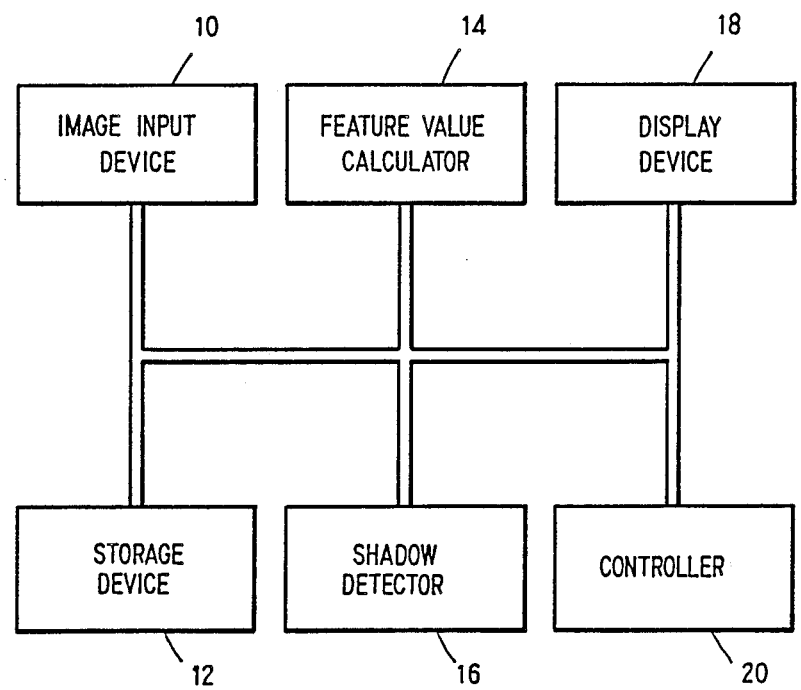
FIG. 1 shows a block diagram illustrating an embodiment of the present invention.

FIG. 1 illustrates an embodiment of the present invention applied to a chest radiograph processing system. An image input device 10 such as an image scanner scans a chest radiograph and produces a quantized image with resolution of 1 mm, for example. In the present embodiment, the quantized image is represented as a plurality of picture elements (pixels), each being represented by eight bits (256 levels). The quantized image produced by the image input device 10 is stored into a storage device 12. A feature value calculator 14 calculates certain feature values for detecting candidates of lung cancers (circular components) or blood vessels (linear components) by scanning the quantized image with a multiple circular window filter to be described later. A shadow detector 16 detects the shadows of the lung cancer candidates or blood vessels based on said calculated feature values. The detected results can be displayed on a display device 18. A controller 20 controls the entire process from the input of the image to the display of the detected results.

Figure 2:
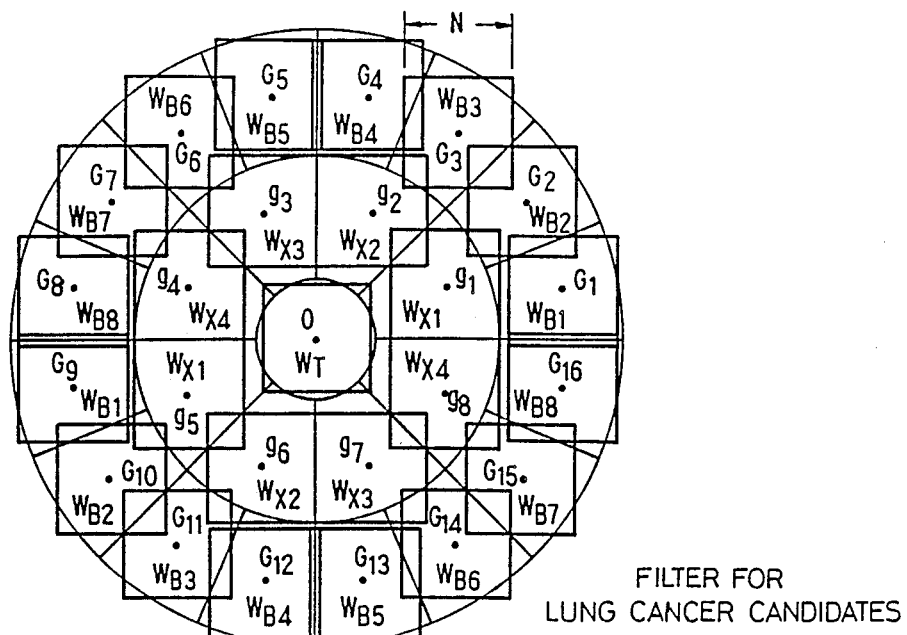
FIG. 2 shows a schematic diagram illustrating a filter for detecting lung cancer candidates.
Figure 3:
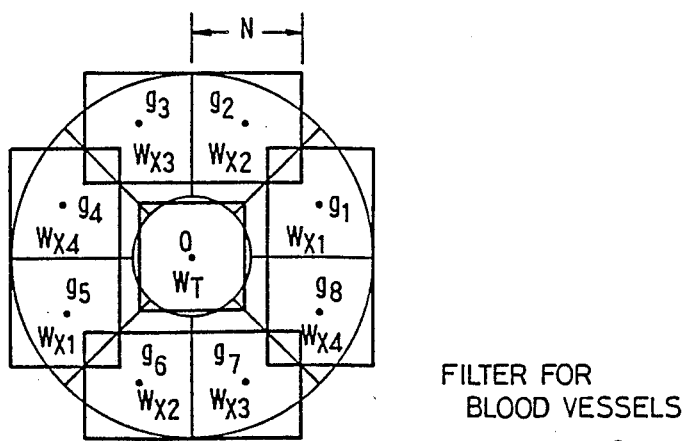
FIG. 3 shows a schematic diagram illustrating a filter for detecting blood vessels.

The feature value calculator 14 constitutes an essential part of the present invention. The feature value calculator 14 includes a filter used for detecting cancer candidate images (see FIG. 2) and a different filter used for detecting blood vessels (see FIG. 3). Based on the respective filter structures, image-related feature values (described hereinbelow) are determined. FIG. 2 illustrates a triple circular window filter for lung cancer candidates, which is comprised of three concentric circles, and FIG. 3 illustrates a double circular window filter for blood vessels, which is comprised of two concentric circles.

In FIG. 2, the radii of the three concentric circles are r, 3r, and 5r, respectively. The value of r varies according to the sizes of the lung cancer candidates desired to be detected. If those which cannot be clearly identified by the naked eye (e.g. those having a diameter of approximately 1 cm each) are to be detected, the value of r may be set as 3 mm, for example. As illustrated in the Fig., the innermost circle defines one segment, while the first annular region bounded by the middle circle and the innermost circle is equally divided into eight segments, and the second annular region bounded by the outermost circle and the middle circle is equally divided into sixteen segments. Each segment, in turn, corresponds to a plurality of pixels, each having an image value (from 1 to 255). The symbols $W_T$, $W_{Xi}$ (i=1, 2, 3, 4) and $W_{Bj}$ (j=1, 2, ..., 8) indicated within the respective segments are the average image concentration values of the pixels located within a pair of corresponding segments. As seen from the Figure, the segments of each pair are located symmetrically relative to the origin O, thereby rendering the $W_B$ of the filter directional. This is similar for the filter illustrated by FIG. 3.

The feature value calculator 14 calculates a feature value S for a subject pixel by scanning the quantized image with the filter illustrated by FIG. 2, with the origin O of the filter being positioned over the center of the subject pixel.

1. In case of $W_T \geq$ Max $W_X \geq$ Max $W_B$:

$$S = \frac{W_T}{\text{Max } W_B} - 1 \qquad (1)$$

2. In the other cases:

$S = 0$

Max $W_X$ and Max $W_B$ represent the maximum values of $W_{Xi}$ and $W_{Bj}$, respectively. The filter defined by the above expression is characterized as follows. First, as to concentrations, the filter responds to patterns in which the concentration is higher in its center than in its periphery, thereby excluding the other patterns. As to shapes, the filter can exclude patterns with long and narrow shapes crossing the center of the filter, since the maximum value of $W_{Bj}$ is employed as the denominator on the right-hand side of the above expression (1). This is equivalent to weakening the maximum directional component and, in other words, enhancing the other directional components. Further, as to sizes, the triple circular structure of the filter permits the selection of the sizes of patterns to be detected. For example, when r=3 mm, the filter can detect the patterns of approximately 1 to 3 cm in diameter.

In calculating the average concentration values of the respective segments to calculate the S feature values for the pixels, it is noted that a circular window having pieshaped segments would make the calculation quite complicated. Therefore, in the present embodiment, the respective segments are approximated with rectangular blocks with the same size. With the length N of a side of a rectangular block and the origin point O at the center of the filter, the polar coordinates of the center positions of the respective blocks $g_n$ (n=1, 2, ..., and 8) and $G_m$ (m=1, 2, ..., and 16) are expressed as follows:

$N \approx \pi^{\frac{1}{2}} \cdot r/a$ $g_n = (5^{\frac{1}{2}} \cdot r, (2n-1)\pi/8)$ $G_m = (17^{\frac{1}{2}} \cdot r, (2m-1)\pi/16)$ The length N of a side of the rectangular block is represented in units of pixels. An integer which is nearest to $\pi^{\frac{1}{2}} \cdot r/a$ is selected as the value of N. The value "a" denotes the length of a side of a pixel. In the present embodiment, a=1 mm and r=3 mm. The result of calculation of the above approximate expression for N is 5.31736 ..., and accordingly N=5. This means that each rectangular block includes a partial image of 5×5 pixels (25 pixels). In the example of FIG. 2, the filter is approximated with 25 rectangular blocks. Although the concentrations of the pixels in the overlapping areas of the blocks would be calculated duplicately, experiments have revealed that such overlapping does not affect the accuracy in the detection.

When the quantized image is scanned with the filter of FIG. 2, the scanning is performed by positioning the center of the filter over the "center position" of one pixel (on the image) after another. While the center positions of the respective blocks approximating the filter are represented by the polar coordinates in the above example, the x-y coordinates are actually calculated. With the position of the center of the filter (pixel position) having been decided, the x-y coordinates can be easily calculated. If the calculated position and the pixel position on the image do not coincide with each other, the position of the pixel which is nearest to the calculated position among the four pixels surrounding it is adopted as the center position of the block. Thus, the 25 pixels included in the respective blocks are uniquely selected, and the average concentration values of the respective blocks can be obtained. The time required for calculating the feature values S could be reduced by calculating beforehand the average concentration values of the respective blocks with each respective pixel at the filter origin and storing the values in a storage device that uses addresses which correspond to respective pixels being positioned at the center of the filter.

Since the average concentration values of the respective blocks and the values $W_{Xi}$ and $W_{Bj}$ which are used in calculating the feature values S may vary depending on the number of pixels per block and other factors, it is necessary—in calculating the feature values S—to calculate the values $W_{Xi}$ and $W_{Bj}$ based on the average concentration values of the respective blocks.

The radii of the two concentric circles constituting the filter for detecting blood vessels illustrated by FIG. 3 are r' and 3r', respectively. In order to accomplish precise detections of the shadows of blood vessels of various sizes included in chest radiographs, the use of only one type of filter is insufficient. Therefore, in the present embodiment, two filters with the respective radii r' of 1.5 mm and 3 mm are used. The meanings of the respective symbols shown in FIG. 3 and the approximation with rectangular blocks used in FIG. 3 are similar to those in FIG. 2. As suggested above, with A=1 mm, the value of N is 3, when r'=1.5 mm, and is 5 as in the previous example, when r'=3 mm. When N=5, the average concentration values $W_T$ and $W_{Xi}$ (i=1, 2, 3, and 4) of the respective blocks are the same as in the case of the filter of FIG. 2. When N=3, since the number of the pixels in each block is 9, it is necessary to calculate again the average concentration values. The results of the calculations are stored in the storage device.

The feature value S' is calculated for each pixel according to the following expression:

$$S' = \frac{W_T}{\left( \sum_{i=1}^{4} W_{Xi} - \text{Max } W_X \right)/3} - 1 \qquad (2)$$

The filter of FIG. 3 is also directional, and as understood from the above expression, the maximum directional component crossing the center of the filter is enhanced. On the other hand, in the case of the filter of FIG. 2, the directional components other than the maximum directional component are enhanced.

When the filters of FIG. 2 and FIG. 3 are used for scanning images, there would be a question as to how to treat the edges of the images. In the present embodiment, only the portions of the filters overlapping the images are taken into consideration, ignoring the rest.

Figure 4:
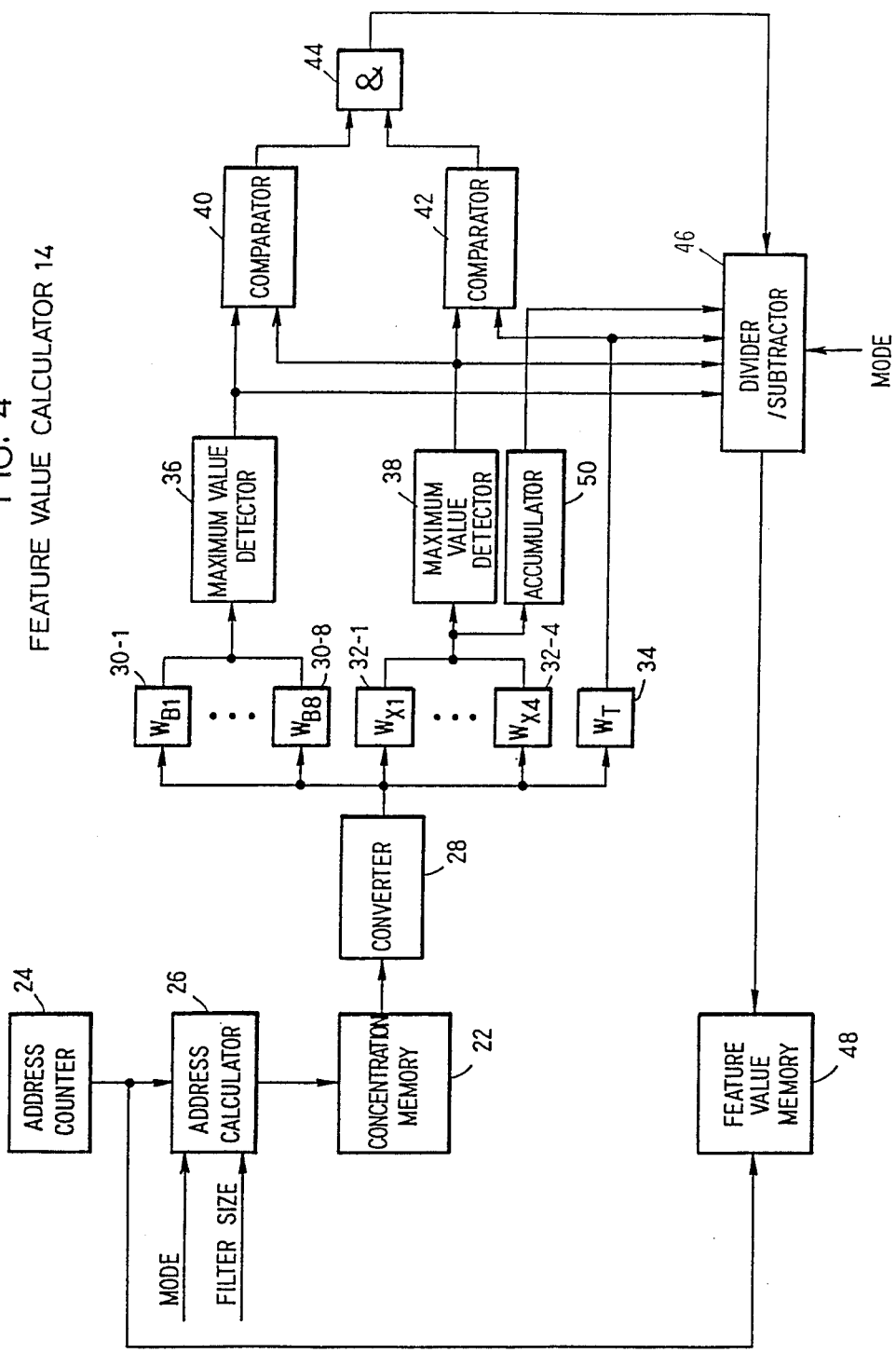
FIG. 4 shows a block diagram illustrating an example of a circuit structure of the feature value calculator.

FIG. 4 illustrates an example of the circuit structure of the feature value calculator 14. In this example, it is assumed that the average concentration values (for the $W_B$'s and $W_X$'s) have already been calculated and stored in a concentration memory 22 by the controller 20 for each respective pixel position of the quantized image. The addresses of the concentration memory 22 preferably correspond to the pixel positions (0, 0), (0, 1), (0, 2), ..., and (M, N). For the resolution of 1 mm, it is desired that M and N are on the order of 300, respectively, in the case of an ordinary chest radiograph. An address counter 24 is sequentially up-dated (from 0 through $MN-1$, i.e. 89999) corresponding to the position of the center of the filter which is registered sequentially with the respective pixels of the quantized image. An address calculator 26 calculates the concentration memory addresses which represent the center positions of the associated rectangular blocks, and then transfers the addresses sequentially to the concentration memory 22. To the address calculator 26, not only the address counter values but also mode signals and filter size signals are supplied. The mode signals indicate which should be detected, lung cancer candidates or blood vessels. The filter size signals are effective only in the blood vessel detecting mode, and indicate which of the two filters should be used. The address calculator 26 calculates the addresses corresponding to the center positions O, $g_1-g_8$, and $G_1-G_{16}$ of the respective blocks approximating the filter of FIG. 2 in case of the lung cancer candidate detecting mode, and calculates only the addresses corresponding to the center positions O, and $g_1-g_8$ of the respective blocks approximating the filter of FIG. 3 in case of the blood vessel detecting mode.

These addresses are transferred to the concentration memory 22 in a predetermined sequence. As an example, the case of FIG. 2 will be explained below. In the filter of FIG. 2, each of the blocks, besides the central one, is paired with another one located symmetrically about the origin 0, and the average of the average concentration values for each pair of the blocks should be calculated. Therefore, the address calculator 26 transfers sequentially the addresses of the center positions of the paired blocks to the concentration memory 22. For example, the addresses are transferred in the sequence of $g_1$, $g_5$, $g_2$, $g_6$, and so on. The average concentration values for the paired blocks are sequentially transferred from the concentration memory 22 to a converter 28. Then, the converter 28 averages the average concentration values for each pair of the blocks and stores the averages into the corresponding register 30—j (i=1, 2, ..., 8) or 32—j (i=1, 2, 3, and 4). However, only the average concentration value for the block corresponding to the origin point 0 of the filter is stored into a register 34 without any conversion. The subsequent stages will be explained below as to each mode.

LUNG CANCER CANDIDATE DETECTING MODE

In this mode, all of the registers 30—j, 32—i, and 34 are loaded. To examine the conditions for calculating the feature values S, the contents of the registers 30—j are transferred to a maximum value detector 36, and the contents of the registers 32—i are transferred to another maximum value detector 38. These maximum value detectors 36 and 38 detect the maximum value of $W_{Bj}$, namely Max $W_B$, and the maximum value of $W_{Xi}$, namely Max $W_X$, respectively, by comparing the contents of the related registers. The values Max $W_B$ and Max $W_X$ are transferred to a comparator 40. The comparator 40 would have its output activated, when Max $W_X \geq$ Max $W_B$. Another comparator 42 receives Max $W_X$ and the content of the register 34, namely $W_T$, and would have its output activated, when $W_T \geq$ Max $W_X$. When both of the outputs of the comparators 40 and 42 are activated, namely the condition for calculating the expression (1) is satisfied, an AND gate 44 is conditioned and a divider/subtractor 46 is enabled to calculate the expression (1).

The divider/subtractor 46 receives Max $W_B$ from the maximum value detector 36 and $W_T$ from the register 34 to calculate the expression (1). The divider/subtractor 46 calculates the expression (1) in response to a "set" output from AND gate 44, provided that a mode signal designates the lung cancer candidate detecting mode. Divider/subtractor 46 transfers the output to a feature value memory 48. When the AND gate 44 is not set, the divider/subtractor 46 transfers the output of zero thereto. The feature value memory 48 stores the output value of the divider/subtractor 46 into the position designated by the address counter 24.

The above described operation is repeated every time the position of the center of the filter is changed, until the operation for the final pixel is completed. This is the same in the case of the blood vessel detecting mode to be described below.

BLOOD VESSEL DETECTING MODE

In this mode, the registers 30—j, the maximum value detector 36, the comparators 40 and 42, and the AND gate 44 are not employed. The average concentration values read out from the concentration memory 22 every time the filter is moved are converted by the converter 28 as stated before and stored sequentially into the register 32—i. The register 34 stores an unconverted average concentration value $W_T$. The maximum value detector 38 detects the maximum value of $W_{Xi}$, namely Max $W_X$, as stated before, and transfers it to the divider/subtractor 46.

In the blood vessel detecting mode, an accumulator 50 is further employed. The accumulator 50 accumulates sequentially the contents of the registers 32—i, and ultimately outputs the sum $\Sigma W_{Xi}$. The divider/subtractor 46 receives Max $W_X$ and $\Sigma W_{Xi}$, calculates the expression (2) in response to the mode signal designating the blood vessel detecting mode, and transfers the result to the feature value memory 48. The feature value memory 48 stores it in the position designated by the address counter 24.

The above described operation is repeated for the two types of filters for detecting blood vessels.

While, in the example of FIG. 4, the concentration memory 22 and the feature value memory 48 are provided separately, selected areas of the storage device 12 (see FIG. 1) may be used for such memories. It is preferred that the respective memories have the areas corresponding to the respective filters.

Referring to FIG. 1, upon completion of the calculation of the feature values, the shadow detector 16 is activated by the controller 20 to detect the shadows of lung cancer candidates and blood vessels. In detecting a lung cancer candidate, the shadow detector 16 searches the maximum feature value among the calculated feature values, and establishes the area of the lung cancer candidate centered at the position corresponding to the maximum feature value by a special method to be described later. This operation is repeated a predetermined number of times. In detecting blood vessels, it is only needed to binary-digitize the calculated feature values by thresholding.

Figure 5:
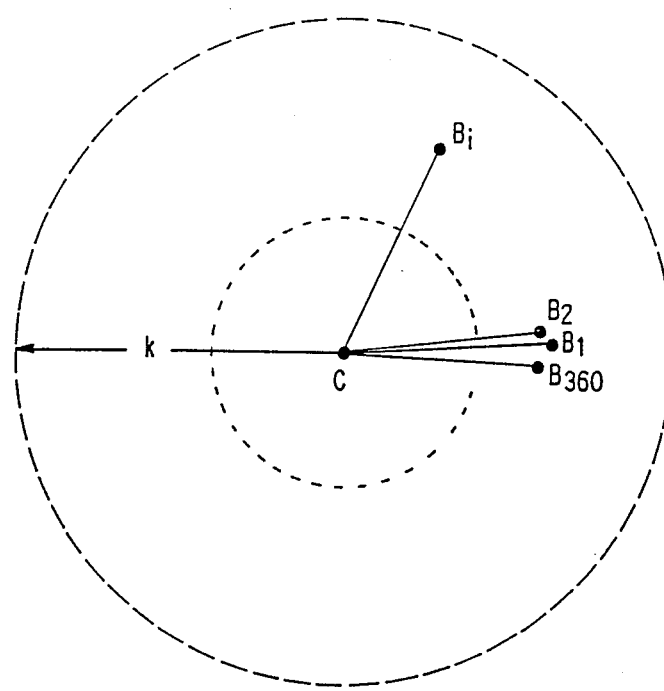
FIG. 5 shows a schematic diagram illustrating the extraction of temporary boundary positions.
Figure 6:
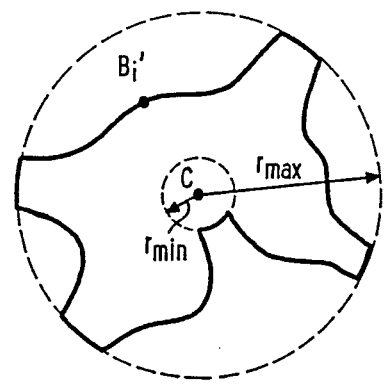
FIG. 6 shows a block diagram illustrating the detected area of a lung cancer candidate.

The operation of the shadow detector 16 in detecting a lung cancer candidate will be described. The shadow detector 16 searches for the maximum feature value (the highest peak in the map of the feature values). Then the detector 16 establishes a circular area with a predetermined radius k (e.g. 2 cm) centered at the pixel position C corresponding to the searched maximum feature value in the quantized image, as shown in FIG. 5. The detector 16 calculates a concentration gradient value in various respective directions within the established circular area. Then, for each direction, the position where the amount of the gradient is the maximum within the area is established as a temporary boundary position $B_i$. A position $B_i$ is determined for each direction, where the directions are spaced at intervals of one degree all through 360 degrees. Next, the maximum radius (threshold) $r_{max}$ from the center position C is established such that the number of $B_i$ located outside the radius would not exceed 10% (e.g. 36) of the total number of $B_i$'s. The minimum radius $r_{min}$ is established to the size of the shadow of the minimum lung cancer (e.g. 4 mm) intended to be detected. Any $B_i$ located outside the band enclosed by $r_{max}$ and $r_{min}$ are moved onto $r_{max}$ and $r_{min}$, respectively. Finally, by connecting sequentially all the $B_i$ established as stated above with each other, the area of the lung cancer candidate is determined. At this time, however, in order to avoid large variations of $B_i$, an average $B_i$ distance is obtained by averaging the five $B_i$ distances preceding and the five $B_i$ values following a subject $B_i$ position. The average value is referred to as the "true boundary position" $B_i$ for the subject $B_i$ position. Ultimately, the area of the lung cancer candidate as illustrated in FIG. 6 is obtained. However, if more than a half of the area is located outside the lung area, such an area should be ignored. For detecting the lung area, there is a known technique employing a differential filter. Since such a detection is not directly related to the present invention, it is not detailed here. The above stated operation is repeated until the number of the areas of the lung cancer candidates has reached 10, for example.

Next, the operation of the shadow detector 16 in case of detecting blood vessels will be described. The shadow detector 16 determines a threshold T from the calculated feature value S' according to the following expression:

$$T = \Sigma S'p / 2 \cdot 1$$

In the above expression, "ΣS' p" denotes the sum of the feature values S' above zero, and "1" denotes the number of S' p. The shadow detector 16 binary-digitizes all the feature values S' by using the threshold T. As stated before, since two types of filters are used in detecting blood vessels, the binary-digitization should be performed twice. Finally, the shadow detector 16 combines the two binary images and eliminates the portion of the shadow located outside of the lung area.

The controller 20 causes the display 18 to display, individually or combined, the images including the shadows of the lung cancer candidates and the blood vessels detected by the shadow detector 16.

According to the present invention, by employing the directional multiple circular window filters and enhancing only the selected directional components in calculating the feature values, circular components and linear components can be extracted distinctly from a complicated image. Further, experiments have revealed that the processing time has been reduced to approximately 70% and 40% of those in case of the conventional circle detector and the linear filter, respectively.

While the invention has been described with reference to preferred embodiments thereof, it will be understood by those skilled in the art that various changes in form and details may be made without departing from the scope of the invention as defined by the claims.

We claim:

1. A pattern recognition system for extracting circular or linear components separately from a complex image including circular and linear components, said system comprising:
   means for calculating feature values including (a) a directional multiple circular window filter which extracts a feature value for a given position of the complex image, (b) means for scanning various positions of the complex image with said filter and (c) means for enhancing at least one selected directional component of feature values extracted with said filter; and
   means for detecting said circular or linear components based on said feature values calculated by said calculating means.

2. A pattern recognition system as in claim (1), wherein said filter comprises a triple circular window filter for said circular components and wherein said calculation means enhances the directional components other than the maximum directional component of said features extracted with said filter.

3. A pattern recognition system as in claim (2), wherein said detecting means searches the maximum value of said feature values and detects a circular component within a predetermined area centered at the position corresponding to said maximum feature value.

4. A pattern recognition system as in claim (3), wherein said circular components are shadows of candidates of lung cancers in a chest radiograph.

5. A pattern recognition system as in claim (1), wherein said calculating means uses a double circular window filter for said linear components and enhances the maximum directional component of said features extracted with said filter.

6. A pattern recognition system as in claim (5), wherein said detecting means binary-digitizes said feature values with a predetermined threshold.

7. A pattern recognition system as in claim (6), wherein said linear components are shadows of blood vessels in a chest radiograph.

8. A pattern recognition system as in claim (1), wherein said multiple circular window filter includes at least one pair of concentric circles, each annular region enclosed by a pair of concentric circles being equally divided into a plurality of segments; wherein the average concentration value of the pixels located within each of said segments and the innermost circle represent a feature value.

9. Apparatus for separately extracting circular and linear components in a complex image, the apparatus comprising:
- circular filter means for covering a portion of the complex image by filter blocks, wherein the filter blocks comprise a center block and at least one set of blocks angularly disposed to encircle the center block;
- means for computing average image concentration value for each of a plurality of directions with said circular filter means covering a subject portion of the complex image, wherein the concentration value for one directional component is a maximum;
- means for computing a first feature value S in which the values of the directional components are evaluated with the maximum directional component being enhanced;
- means for computing a second feature value S' in which the values of the directional components are evaluated with the maximum directional component being weakened; and
- means for selectively applying (a) the first feature value S to detect linear image components and (b) the second feature value S' to detect circular image components.

10. Apparatus as in claim 9, wherein said circular filter means includes a first filter having two concentric sets of blocks, each set encircling the center block at a different respective radius, and each set having a plurality of pairs of blocks symmetrically disposed relative to the center block with a corresponding directional component;
- wherein each pair i of blocks in the inner set has an average image concentration value of $W_{Xi}$; and
- wherein each pair j of blocks in the outer set has an average image concentration value of $W_{Bj}$; and
- wherein said S value computing means comprises means for computing S as either:
  1. If $W_T \leq \text{Max } W_X \leq \text{Max } W_B$:

$$S = \frac{W_T}{\text{Max } W_B} - 1$$

2. Otherwise, S=0.

11. Apparatus as in claim 10, wherein said filter means includes a second filter having a cental block and a set of blocks encircling the center block thereof, and a third filter having a center block and a set of blocks encircling the center block thereof, wherein the blocks of said second filter are all similar in size and smaller in size than the blocks of said third filter which are all similar in size;
- wherein the encircling set of blocks for said second filter and said third filter, each has a plurality of pairs of blocks symmetric relative to the respective center block with a corresponding directional component;
- wherein each ith pair of blocks of a respective set has an average image concentration value $W_{Xi}$ and each respective set has a directional component with a maximum average image concentration value;
- said S' value computing means comprising means for computing S' for said second filter and said third filter as:

$$S' = \frac{W_T}{\left(\sum_{i=1}^{4} W_{Xi} - \text{Max } W_X\right)/3} - 1.$$

12. Apparatus as in claim 11, further comprising:
- means for registering said filters to cover one portion of the complex image after another.

13. Apparatus as in claim 12, wherein said selective applying means includes:
- means for selecting said S value computing means or said S' value computing means.

14. Apparatus as in claim 13, wherein each covered position and the feature value computed therefor, corresponds to a pixel and wherein the apparatus further comprises:
- shadow detector means for selectively detecting circular components or linear components based selectively on either (a) S feature values for respective pixels in the complex image or (b) S' feature values for respective pixels in the complex image.

* * * * *